United States Patent Office 3,493,522
Patented Feb. 3, 1970

3,493,522
SYNTHESIS OF POLYMERIC SCHIFF BASES BY REACTION OF ACETALS AND AMINE COMPOUNDS
James E. Webb, Administrator of the National Aeronautics and Space Administration, with respect to an invention of Gaetano F. D'Alelio, Notre Dame, Ind.
No Drawing. Filed Nov. 9, 1966, Ser. No. 593,606
Int. Cl. C08g 9/06
U.S. Cl. 260—2      16 Claims

ABSTRACT OF THE DISCLOSURE

Schiff-base polymers having the formula

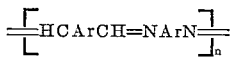

where Ar is an arylene moiety are prepared in tractable, high-molecular-weight form amenable to fabrication into useful articles by reacting an acetal having the formula $(RO)_2HCArCH(OR)_2$ where R is an alkyl group with an amine compound, which can be difunctional amine having the formula $H_2NArNH_2$, an arylamine having the formula $RCOHNArNHOCR$ or a Schiff base having the formula $RHC=NArN=CHR$. These reactions are preferably carried out by heating the reactants to a temperature of 250 to 300° C. in a monofunctional Schiff-base medium to produce a fusible, tractable intermediate. Further heating in the presence of a Lewis acid converts the polymer to a black, infusible material having a very high degree of thermal stability.

---

The invention described herein was made in the performance of work under a NASA grant and is subject to the provisions of Section 305 of the National Aeronautics and Space Act of 1958, Public Law 85–568 (72 Stat 435; 42 U.S.C. 257).

This invention relates to processes for the synethesis of Schiff-base polymers.

Polymeric Schiff bases of the general formula

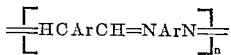

where Ar represents an arylene moiety exhibiting outstanding heat-resistant properties. Polymers having this structure can withstand temperatures in excess of 400° C. for sustained periods without undergoing significant degradation or phase changes. This high degree of thermal stability is believed to result from the conjugated structure of the polymer, the double bond —C=N— linkage characteristic of Schiff bases being alternated with arylene groups. Schiff-base polymers offer an attractive material for application in the aerospace field as well as for other uses requiring high-temperature stability.

Schiff-base polymers have been prepared previously by a condensation reaction of an aromatic dialdehyde with an aromatic diamine in a solution system, for example, by reaction of terephaldehyde with p-phenylenediamine in benezene or alcohol. The product of this reaction has been a yellow-to-orange "brick dust" powder having a low molecular weight, approximately that of a dimer, that is, $n$ in the above formula is approximately two. The "brick dust" polymer is an intractable material, infusible and insoluble in most solvents and therefore not amenable to fabrication into useful products. Black polymers should be expected from these reactants if the molecular weight is sufficiently high that conjugation is extensive. It is desired to prepare these polymers in the form of tractable, black, high-molecular-weight material suitable for further processing.

Black Schiff-base polymers have now been prepared by reacting the aromatic diamine and aromatic dialdehyde in a melt system, a mixture of the reagents being heated to a temperature above the melting point. Polymerization to a high molecular weight proceeds very rapidly under these conditions, but the reaction is difficult to control and this process does not permit isolation of a tractable, fusible polymer at an intermediate stage. Better control over this reaction has been achieved by use of a molten monofunctional Schiff base such as benzilideneaniline for the reaction medium, the monofuncitional Schiff base serving both as a solvent and as a moderator for the reaction. This process is the subject matter of applicant's copending application Serial Number 593,595, filed Nov. 9, 1966. A need still exists, however, for an improved process for synthesizing these polymers wherein a tractable, fusible polymer suitable for further processing can be readily obtained.

It is therefore an object of this invention to provide an improved process for synthesizing Schiff-base polymers.

Another object is to provide a process for preparing Schiff-base polymers in a tractable, fusible form suitable for further procesing.

Other objects and advantages of the invention will be apparent from the following description.

In the present invention Schiff-base polymers having the formula

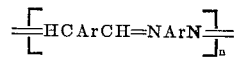

are prepared by reacting a difuctional aromatic acetal with a difunctional aromatic amino compound in the group consisting of amines, acylamines and Schiff bases having a difunctional amino moiety. These reactions proceed more slowly than the diamine-dialdehyde condensation reaction and polymerization can be interrupted to obtain a tractable, fusible, black polymer suitable for further processing. The three reactions included in this invention are described in detail below under the headings "Acetal-Amine Reaction," "Acetal-Acylamine Reaction," and Acetal-Schiff Base Reaction."

Acetal-amine reaction

In this embodiment a difunctional amine of the formula $$H_2NArNH_2$$

where Ar is an arylene moiety is reacted with a difunctional aromatic acetal of the formula $$(RO)_2HCArCH(OR)_2$$

where Ar is an arylene moiety and R is an alkyl group containing no more than ten carbon atoms. The polymerization reaction is postulated to proceed as follows:

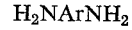

The reaction proceeds to a high molecular weight, the equilibrium being shifted by removal of the by-product primary alcohol from the reaction mixture by distillation.

The acetal reactant is represented by the formula $$(RO)_2HCArCH(OR)_2$$

where Ar is an arylene moiety and R is an alkyl group. The arylene moiety can be m-phenylene, p-phenylene, a phenylene group having one or two hydrogen atoms substituted by methyl groups, or a group consisting of two phenylene rings linked by one or more hetereo atoms or groups such as O, S, $SO_2$, $C=O$, NH, N—$CH_3$, $C_2H_2$, or CH₂ and SO₂, and the like. Aliphatic chain linkages containing more than one methylene group are excluded from the groups between phenylene rings since the conjugated structure of the polymer backbone, which is critical to thermal stability, would not be attained. In the latter group the linkages attached to the phenylene groups can be in the meta-meta, para-para, or para-meta positions. The alkyl groups represented by R in the formula can be methyl, ethyl, propyl, isopropyl, butyl, amyl hexyl, octyl, or decyl, or combinations thereof. Examples of specific acetals can be used include xylylidenetetraethyl ether, xylylidenetetra - n-butyl ether, xylylidenetetraoctyl ether and xylylidenetetradecyl ether. Xylylidenetetra - n - butyl ether is preferred because it is easily prepared and because its reactivity, which is lower than that of the methyl and ethyl derivatives, allows a longer reaction time during the fusible polymer stage in the polymerization process. However, the methyl and ethyl ethers can be used.

The aromatic diamine reactant is represented by the formula

H₂NArNH₂ where Ar is an arylene moiety as defined above. Illustrative examples of specific amine reactants are p-phenylenediamine, m-phenylenediamine, and the p,p; p,m'; and m,m' forms of bianiline, diaminodiphenyl sulfide, diaminodiphenyl sulfone, diaminodiphenyl amine, diaminodiphenyl ethylene and 3,7 - diaminothioxanthene-5,5-dioxide. Because of its lower cost and the more smooth polymerization reaction obtained, m-phenylenediamine is the preferred amine reactant.

The amine-acetal polymerization reaction can be carried out by solution or melt methods or by a modified melt method using a molten mono-functional Schiff base as the reaction medium. The modified melt method is preferred since the solution method produces a low-molecular-weight polymer which requires further treatment to obtain a high molecular weight, and the unmodified melt method is more difficult to control. In each method the acetal and amine are reacted at equimolar proportions in accordance with the equation given above. A molar excess of either reagent can be used, however, in which case the excess unreacted material is removed from the polymer by volatilization in subsequent heating steps.

In the preferred method the amine and acetal are mixed with a monofunctional Schiff base and the mixture is heated to a temperature above its melting point to initiate polymerization. The monofunctional Schiff base serves both as a solvent and as an effective means for moderation and control of the reaction. In addition, this material enters into the polymerization reaction to a limited extent, as evidenced by product yields in excess of 100% based on the weight of the reactants. The monofunctional Schiff base in this reaction is represented by the formula

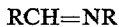

RCH=NR where R is an aryl moiety. Examples of aryl moieties included are C₆H₅, CH₃C₆H₄, (CH₃)₂C₆H₃, (CH₃)C₆H₂, C₆H₅C₆H₄, C₆H₅OC₆H₄, C₆H₅SC₆H₄, CH₃OC₆H₄. Benzylideneaniline, C₆H₅CH=NC₆H₅ is preferred. The monofunctional Schiff base is preferably provided in the reaction mixture at a weight proportion at least equivalent to the weight of the product, but the proportion is not critical. Higher proportions may result in premature termination or even reversal of the reaction before completion, in which case a portion of the excess should be removed by distillation.

The polymerization reaction is initiated at a temperature only slightly above the melting point of the mixture of about 130° C. The mixture is then heated slowly, preferably at a temperature increase rate of 5 to 25° C. per minute up to 250° C. to 300° C. The by-product alcohol is evolved from the mixture as the temperature is increased. During the course of this step, polymerization proceeds through increasing stages of molecular weight as evidenced by vivid changes in color from an initially bright yellow-orange to dark brown to black. An equilibrium stage is then reached, and no further polymerization will occur until the monofunctional Schiff base is removed. In order to ensure completion of the reaction it is preferred to maintain the mixture at about 250° C. to 300° C. for an extended period of about 2 to 5 hours.

The product polymer is then recovered by removing the monofunctional Schiff base, preferably by distillation at a temperature of 300° C. to 350° C. The product, in the form of a glassy, black coherent mass can be polymerized further in the solid state by heating to a temperature not exceeding about 400° C. This treatment serves to improve mechanical properties of the polymer. Unless the final polymer is desired directly, higher temperatures are to be avoided since the polymer would become infusible and intractable. The black, fusible polymer is then ground into small fragments or powder for further processing to be described below.

In order to avoid oxidation and side reactions the polymerization reaction and subsequent heating steps are carried out in the absence of moisture and oxygen. An atmosphere of inert gas such as nitrogen is suitable for this purpose. For this reason and to provide for removal of the by-product and monofunctional Schiff base, the reaction is conducted in apparatus provided with distilling equipment and an inert gas inlet. Gas pressure over the reaction mixture is not critical, but a substantially reduced pressure, for example, down to 1 mm. Hg, is preferred in the latter heating stages to enhance removal of volatilized products.

The amine-acetal polymerization reaction can also be carried out by a solution method, the amine and acetal being reacted in an organic solvent. This method produces a yellow-to-brown powdery polymer of low molecular weight, which can be converted to a useful form by a subsequent heat treatment in the presence of a monofunctional Schiff base. The amine and acetal are first dissolved in an inert organic solvent and polymerization is effected by heating under reflux conditions. Examples of organic solvents which may be used are benzene, toluene, dimethyl formamide, dimethyl acetamide, dioxane, dibutyl ether, etc., with benzene being preferred. The polymer forms an insoluble precipitate in this method before obtaining a high molecular weight, and no further polymerization is obtained after a refluxing period of about one hour. The polymer is readily recovered from the reaction mixture by filtration.

Conversion of the yellow, solution-produced polymer to a higher molecular weight form can be carried out by heating the polymer in an excess of a monofunctional Schiff base of the formula given above to a temperature of about 250° C. to 300° C., holding the mixture at this temperature for a period of at least about one hour, and then removing the monofunctional Schiff base by distillation. The resulting black polymer is then recovered and converted to finely divided form for further processing.

The amine-acetal reaction can also be carried out by a melt method, a mixture of the reactants being heated to a temperature above the melting point in the absence of any solvent or added material. The reaction is initiated at above 100° C. and proceeds readily as the temperature is increased. The reaction mixture may be heated directly to 250° to 300° C. if it is desired to produce an infusible product directly. If a tractable polymer is desired and it is intended to avoid formation of infusible, intractable material, the temperature should be carefully controlled in this method. Heating to a temperature of 250° to 300° C. at a rate of 5 to 25° C. per minute and holding at 250° to 325° C. for a period of one-half to three hours are the preferred conditions. The product polymer, a black, glassy material is then recovered and converted to finely divided form.

Acetal-acylamine reaction

In the acetal-acylamine embodiment an acetal of the formula given above is reacted with an acylamine of the formula RCOHNArNHOCR where Ar is an arylene moiety and R is an alkyl group as described above. The polymerization reaction is postulated to proceed according to the following equation:

nRCOHNArNHOCR + n(R'O)₂HCArCH(OR')₂ ⟶

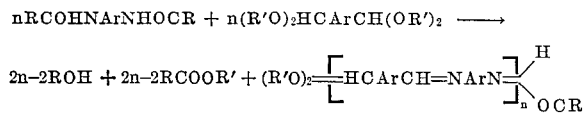

The by-product alcohol and ester are removed from the reaction mixture by heating so that the reaction proceeds to a high molecular weight.

The acetal reactant in this reaction is the same as described above for the acetal-amine reactions. The acylamine reactant is represented by the formula RCOHNArNHOCR where Ar is an arylene moiety and R is an alkyl group. Ar in this formula can be any of the arylene moieties given above for Ar in the amine and acetal reactants. and R can be any alkyl group having up to ten carbon atoms. Examples of specific acylamines included are N,N-diacetyl-p-phenylenediamine, p,p' - diacetaminodiphenyl oxide, p,p'-dibutylaminodiphenylsulfide, m,m' - didecyl-aminodiphenylsulfoxide, N,N'-dipropronyl-m-phenylenediamine, p,p'-diacetaminodiphenylmethane, diacetaminodiphenylethylene, 3,7 - diacetaminothiaxanthene-5,5'-dioxide, etc.

The acetal-acylamine reaction can be carried out by melt and solution methods and by a modified melt method using a monofunctional Schiff base as the reaction medium, each of these methods being similar to the methods described above for the acetal-amine reaction. The acetal-acylamine reaction proceeds more slowly, however, and a catalyst may be required in some cases to initiate polymerization. A small amount, for example, 0.5 to 1 weight percent, of a Lewis acid can be used for this purpose. Examples of suitable Lewis acid catalysts include zinc chloride, aluminum chloride, boron trifluoride, titanium tetrachloride, zirconium tetrachloride, mercuric bromide, mobalt iodide, nickel sulfate, cadmium nitrate, cadmium perchlorate, silicon tetrachloride, arsenic tribromide, antimony pentabromide, bismuth trichloride, tin tetrachloride, trimethylamine hydrochloride, trimethylamine hydrobromide, phosphoric acid, tributylphosphonium chloride and p-toluenesulfonic acid.

The modified melt method using a monofunctional Schiff base such as benzilideneaniline for the reaction medium is preferred for the acetalacylamine reaction. Solution methods produce a low-molecular-weight polymer which requires further treatment, and the melt method is more difficult to control. Polymerization is carried out by heating the acetalacylamine mixture in excess monofunctional Schiff base in the same manner as described above for the acetal-amine reaction. By-product alcohol and ester are evolved and are removed by distillation. The product polymer is recovered by removing the monofunctional Schiff base, also by distillation.

Polymerization to the desired high-molecular-weight product can also be carried out by reacting the acetal and acylamine in an inert organic solvent such as the solvents given above for the acetal-amine reaction, recovering the resulting low-molecular-weight polymer and heating it in the presence of a monofunctional Schiff base to a temperature of 200° to 300° C. for a period of 1 to 5 hours. Polymerization by the melt method is carried out by heating the acetal and acylamine in the absence of solvent or reaction medium to a temperature of about 250° to 300° C. This reaction is initiated at a higher temperature than the amine-acetal reaction, but proceeds readily in this temperature range.

Acetal-Schiff base reaction

Schiff base polymers are prepared in this embodiment by reacting an acetal of the formula given above with a Schiff base of the formula RHC=NArN=CHR where Ar is an arylene moiety and R is an aryl group. This reaction is postulated to proceed as follows:

n(RO)₂HCArCH(OR)₂ + nR'HC=NArN=CHR' ⟶

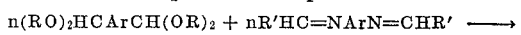

The by-product ether is evolved during the course of heating the reaction mixture, and polymerization proceeds to a high molecular weight. This reaction is the most easily controlled of the acetal reactions and thus is the most advantageous for the preparation of fusible tractable polymers suitable for further processing.

The acetal reactant in this embodiment is the same as described above for the acetal-amine and -acylamine reactions. The difunctional Schiff base reactant is represented by the formula RHC=NArN=CHR where Ar is an arylene moiety and R is an aryl moiety. Ar in this formula can be any of the arylene moieties given above in the definition of the acetal reactant and R can be phenyl, tolyl, xylyl, biphenyl, trimethylphenyl, phenoxyphenyl, thiophenoxyphenyl, methoxyphenyl, etc. Examples of specific Schiff bases included are dibenzylidene-p-phenylenediamine, dibenzylidene-m-phenylenediamine, N,N'-bisbenzylidene benzidine, 4,4'-bis(benzylideneamino)diphenylmethane, 4,4' - bis(benzylideneamino)diphenylether, 4,4'-bis(benzylideneamino)diphenylamine, 4,4'-bis(benzylideneamino)diphenylsulfide, 4,4'-bis(benzylideneamino)diphenylsulfone, and 3,7 - bis(benzylideneamino)thiaxanthene - 5,5-dioxide. Benzylidene-m-phenylenediamine is preferred because of its low cost, ease of preparation, and more favorable performance in that the melt is maintained in a viscous state for a longer period and by-product elimination is more complete than for the corresponding para compound.

The acetal-Schiff base reaction can be carried out by melt or solution methods or by a modified melt method using a monofunctional Schiff base as the reaction medium. As is the case for the acetal-amine and acetal-acylamine reactions described above, the modified melt method is preferred for the acetal-Schiff base reaction. The reaction conditions described in detail above for the acetal-amine reaction can be used for the acetal-Schiff base reaction, but a catalyst will be required in most cases to accelerate the slower acetal-Schiff base reaction. A Lewis acid, as defined above for the acetal-acylamine reaction, is suitable for this purpose.

The product polymers obtained by any of the three reactions described above can be prepared in the intermediate stages as a brittle, black, fusible material, provided that they have not been held at the temperature at which they become infusible and intractable, over about 400° C. The black, fusible material has a relatively high molecular weight estimated to be in excess of 20,000, although the insolubility of the polymer has prevented an exact determination. Upon being heated to higher temperatures, this polymer undergoes additional polymerization and is converted to an infusible tough solid with excellent high-temperature stability and good mechanical properties. Fabrication of the polymer into the desired shape or structure must be accomplished while it is in the fusible stage because of the untractable nature of the infusible material.

In a preferred fabrication procedure the fusible polymer in finely divided form is compressed into the desired shape in a suitable mold and heated to a temperature of 400° to 600° C. in the presence of a small amount, for example, 0.5 to 1 weight percent, of a Lewis acid catalyst of the type described above. Heating at this temperature for a period of at least 5 to 20 minutes is preferred although a massive structure will require longer heating times. The bulk of any remaining amounts of unreacted monomers or monofunctional Schiff base are removed during this treatment. The finely divided polymer melts and flows together and then solidifies in infusible, tough form. In order to avoid or reduce oxidative degradation, an atmosphere of an inert gas, preferably nitrogen, should be provided during this step. During this treatment reactant by-products are formed, and they as well as remaining amounts of monofunctional Schiff base are removed by postheating the molded form in an inert atmosphere at 700° to 1,000° C. for one to four hours or more.

In fabrication of composite heat shields, for which Schiff-base polymers are a particularly attractive material, the fusible polymer is intermingled with other components of the composite, for example, fibers of a refactory reinforcing material such as fiberglass, boron or silica, and the composite is compressed and subjected to the 400° to 600° C. heat treatment.

This invention is further illustrated by the following examples. The parts and percentages given are by weight unless otherwise specified. Examples I through VII show preparation of Schiff base polymers by the acetal-amine reaction; VIII through IX, the acetal-acylamine reaction; and X through XVI, the acetal-Schiff base reaction.

Example I

A mixture of 4.512 parts xylylidenetetra-n-butyl ether, 1.495 parts m-phenylenediamine and 5.019 parts benzylideneaniline is heated in a reaction flask equipped with a distilling head, a condenser, an adapter and a receiver, a vacuum line being attached to the adapter. The mixture is heated according to the following schedule: 1.5 hours at 100° to 130° C. and atmospheric pressure, 1 hour at 130° to 150° C. at atmospheric pressure, 17.0 hours at 150° to 230° C. at atmospheric pressure and 23.0 hours at 230 to 320° C. under 0.6 to 1.2 mm. Hg pressure. After initially forming an orange liquid, the mixture is gradually converted to a red-brown liquid and then a black solid. The black solid polymer is recovered at a yield of 4.75 parts.

A 1.4277 gram sample of the product polymer is postheated at 425° C. under a nitrogen atmosphere in a quartz reaction tube equipped with a nitrogen bleeder, a condenser, an adapter and a receiver. The sample is heated for 40 hours at 425° C., and 1.154 grams of black, slightly shiny powder is recovered. A 1.3550 gram sample is postheated by this procedure at 600° C. for 20 minutes under a nitrogen atmosphere, 0.9058 gram of black solid being recovered.

The product polymer and the samples subjected to postheating at 425° C. and 600° C. are subjected to thermogravimetric analysis in air to determine their thermal stability. In each analysis a 10 mg. sample is heated to a rate of 15° C. per minute and a gas flow of one standard liter per minute is used. The as-prepared polymer loses 2.5% of its weight at 400° C., 20% at 500° C., 86% at 600° C., and 100% at 770° C. The corresponding percent losses for the 425° C. heated sample and the 600° C. heated sample are 0, 1, 32, 94, and 0, 1, 28, 97 respectively.

Example II

A mixture of 4.512 parts xylylidenetetra-n-butyl ether and 1.410 parts m-phenylenediamine is reacted according to the procedure of Example I. A black solid product, which appears brown after grinding, is recovered at a yield of 2.33 parts. Samples of this product are postheated at 425° C. and 600° C. and subjected to thermogravimetric analysis in air according to the procedure of Example I. The as-prepared polymer loses 4% of its weight at 400° C., 38% at 500° C., 88% at 600° C. and 100% at 700° C. The 425° C. heated sample and the 600° C. heated sample lose 0, 1, 39, 99 and 0, 1, 21, 97 percent respectively.

Example III

A mixture of 3.3097 parts xylylidenetetra-n-butyl ether, 0.8736 part p-phenylenediamine and 5.3649 parts benzylideneaniline is reacted according to the procedure of Example I. A brown polymer is recovered at a yield of 2.51 parts. Samples of this polymer are then subjected to 425° C., and 600° C. postheating and thermogravimetric analysis in air by the procedure of Example I. The percent weight losses in air at 400°, 500°, 600° C., and 700° C. for the as-prepared, 425° C. heated and 600° C. heated samples are 20, 29, 73, 100; 0, 2, 48, 99; and 0, 27, 97, 100, respectively.

Example IV

A mixture of 3.3606 parts xylylidenetetra-n-butyl ether and 0.8840 part p-phenylenediamine are reacted by the procedure of Example I. A black-brown solid is recovered at a yield of 1.80 parts. Samples of this product are subjected to 425° C. and 600° C. postheating and thermogravimetric analysis in air by the procedure of Example I. The percent weight losses in air at 400°, 500°, 600°, and 700° C. for the as-prepared 425° C. heated and 600° C. heated samples are 7, 73, 100, 100; 0, 2, 78, 100; and 0, 52, 93, 100, respectively.

Example V

A mixture of 1.4 parts m-phenylenediamine and 3.92 parts of xylylidenetetraethyl ether are heated in a flask provided with a condenser, receiver and gas inlet. The mixture is heated under a nitrogen atmosphere according to the following schedule: 1.5 hours at 100° C., 1.5 hours at 170° C., 2.5 hours at 180° C., 13.5 hours at 230° C., all at atmospheric pressure, and 10.0 hours at 230° C. and 0.5 mm. Hg pressure. A brown solid is formed at 170° C., and the solid turns partially black at 230° C. A blackish brown polymer is recovered at a yield of 3.0 parts.

Example VI

A mixture of 1.11 parts m-phenylenediamine, 3.11 parts xylylidenetetraethyl and 5 parts benzylideneaniline is heated in the apparatus of Example V according to the following schedule: 1.5 hours at 100° C., 4.0 hours at 110° C., 12.5 hours at 180° C., all at atmospheric pressure, and 24 hours at 230° C. at 0.5 mm. Hg pressure. The mixture undergoes a vivid change in color from bright orange to brown to black as the temperature is increased, and the viscosity progresses gradually from liquid to hard solid. A black hard solid is recovered at a yield of 5.6 parts.

Example VII

A mixture of 1.446 parts p-phenylenediamine, 3.92 parts xylylidenetetraethyl ether and 5 parts benzylideneaniline is heated in the apparatus of Example V according to the following schedule: 6.0 hours at 100° C. and atmospheric pressure, 7.0 hours at 240° C. and 1.5 mm. Hg pressure, 16.0 hours at 300° C. and 1.0 mm. Hg pressure, and 24 hours at 400° C. and 1.0 mm. Hg pressure. A yellow solid forms at 100° C. and turns to dark yellow and to dark brown as the temperature is increased. A dark brown solid polymer is recovered at a yield of 4.5 parts.

Example VIII

A mixture of 2.0 parts p-xylylidenetetraethyl ether, 1.363 parts N,N'-diacetyl-p-phenylenediamine and 0.12 part toluenesulfonic acid is heated under a nitrogen atmosphere in the apparatus of Example V to a temperature of 220° C. for 19 hours. The mixture remains homogeneous and increases in viscosity during the course of heating, the color changing from yellow to black. After extraction with acetic acid, 1.61 parts of a black solid polymer is recovered.

Example IX

A mixture of 1.0 part xylylidenetetraethyl ether, 0.6815 part N,N'-diacetyl-p-phenylenediamine and 6 parts of benzyylideneaniline is heated in the apparatus of Example V under a nitrogen atmosphere according to the following schedule: 1½ hours at 185° C. and atmosphere pressure, 5 hours at 220° C. and atmospheric pressure, 2 hours at 260° C. and 100 to 200 mm. Hg pressure, and 1½ hours at 320° C. and 20 mm. Hg pressure. The mixture initially increases in viscosity, but no further change occurs until the excess benzylideneaniline is removed during heating at 320° C. The mixture is then converted to a black solid. After extraction with alcohol, 1.1 parts of black solid polymer is recovered.

Example X

A mixture of 0.8043 part xylylidenetetraethyl ether, 0.8043 part dibenzylidene-p-phenylenediamine and 1.5 parts benzylideneaniline is heated in a flask equipped with a gas inlet, a distilling head, a condenser, a receiver and a vacuum outlet. The mixture is heated under a nitrogen atmosphere for 4 hours at 220° C. at 100 mm. Hg pressure, for 12 hours at 240° C. and 180 mm. Hg, and for 3½ hours at 320° C. and 20 mm. Hg pressure. The mixture becomes black and highly viscous at 220° C. and solidifies within one hour at 320° C. After extraction with alcohol a black solid polymer is recovered at a yield of 0.7 part.

Example XI

A mixture of 1.39 parts dibenzylidene-m-phenylenediamine and 1.39 parts xylylidenetetraethyl ether is heated in the apparatus of Example X under the following schedule: 2 hours at 180° to 190° C. and 15 mm. Hg pressure, 4 hours at 230° C. and 15 mm. Hg pressure, 13 hours at 250° C. and 0.2 mm. Hg and 27 hours at 270° C. and 0.2 mm. Hg pressure. A porous, brittle, black polymer is recovered at a yield of 1.1 parts.

Example XII

A mixture of 1.5 parts dibenzylidene-m-phenylenediamine, 1.5 parts xylylidenetetraethyl ether and 5 parts benzylideneaniline is heated under a nitrogen atmosphere in the apparatus of Example X according to the following schedule: 2 hours at 180° C. and 15 mm. Hg pressure, 1 hour at 250° C. and 15 mm. Hg pressure, 2.5 hours at 230° C. and 15 mm. Hg pressure, 13 hours at 250° C. and 15 mm. Hg pressure and 27 hours at 270° C. and 0.2 mm. Hg pressure. The mixture, after melting as a brown solution, becomes darker brown and highly viscous as the temperature is increased to 230° C. and a black solid is produced at 270° C. The solid is recovered at a yield of 1.66 parts.

Example XIII

A mixture of 2.8166 parts of xylylidenetetra-n-butyl ether, 2.0077 parts dibenzylidene-m-phenylenediamine, 4.6 parts benzylideneaniline and 0.1 part zinc chloride is heated under a nitrogen atmosphere in the apparatus of Example I according to the following schedule: 1.5 hours at 100° to 130° C., 1.0 hour at 130° to 150° C., 17 hours at 150° to 230° C., all at atmospheric pressure, and 47 hours at 230° to 320° C. at 0.8 mm. Hg pressure. A black, shiny polymer is recovered at a yield of 3.25 parts.

A sample of the product polymer is then postheated at 425° C. for 40 hours under a nitrogen atmosphere, and the as-prepared and postheated polymer are subjected to thermogravimetric analysis in air by the procedure of Example I. The as-prepared and 425° C. samples lost 0, 9, 68, 100 and 0, 11, 38, 97 weight percent, respectively, at 400°, 500°, 600° and 700° C.

Example XIV

A mixture of 2.8116 parts xylylidenetetra-n-butyl ether, 2.0165 parts dibenzylidene-m-phenylenediamine and 0.1 part zinc chloride is heated under a nitrogen atmosphere according to the following schedule: 1.5 hours at 100° to 300° C., 1.5 hours at 130° to 150° C., 17.0 hours at 150° to 230° C., all at atmospheric pressure, and 23 hours at 230° to 320° C., and 0.8 mm. Hg pressure. A black, shiny polymer is recovered at a yield of 2.50 parts. A sample of this polymer is postheated at 425° C., and the as-prepared and postheated material is subjected to thermogravimetric analysis by the procedure of Example I. Weight losses for the as-prepared and 425° C. heated samples are 4, 35, 83, 100 and 0, 54, 93, 100 percent at 400°, 500°, 600° and 700° C., respectively.

Example XV

A mixture of 3.0807 parts xylylidenetetra-n-butyl ether, 2.2152 parts dibenzylidene-p-phenylenediamine and 0.09 part zinc chloride is heated by the procedure of Example XIV, except that the pressure at 230° to 320° C. is 0.6 mm. Hg. A black, shiny polymer is recovered at a yield of 2.02 parts. A sample of this polymer is postheated at 425° C. and the as-prepared and postheated material is subjected to thermogravimetric analysis by the procedure of Example I. Weight losses for the as-prepared and 425° C. heated samples are 5, 56, 90, 100 and 0, 16, 68, 100 percent, respectively, at 400°, 500°, 600° and 700° C.

Example XVI

A mixture of 3.3617 parts xylylidenetetra-n-butyl ether, 2.4140 parts dibenzylidene-p-phenylenediamine, 5.2493 parts benzylideneaniline and 0.01 part zinc chloride is heated according to the following schedule: 1.5 hours at 100° to 130° C., 1.0 hour at 130° to 150° C., 17 hours at 150° to 230° C., all at atmospheric pressure, and 47 hours at 230° to 320° C. and 0.8 mm. Hg pressure. A black, shiny polymer is recovered at a yield of 3.13 parts. The product polymer is then subjected to postheating at 425° C. and thermogravimetric analysis in air by the procedure of Example I. Weight losses for the as-prepared and 425° C. heated samples are 3, 48, 91, 100 and 2, 43, 97, 100 percent, respectively, at 400°, 500°, 600° and 700° C.

The thermal stabilities of the polymers prepared by the process of this invention are substantially identical to those prepared by the bis Schiff-base exchange process disclosed in my copending application Ser. No. 593,594 filed Nov. 9, 1966 and assigned to the same assignee to which reference is hereby made. In contrast to polymers prepared by previously known solution methods in which the value of $n$ was about 2, the polymers prepared by the present process have a value of $n$ of at least 5 for the fusible material prepared in the initial heating stage and over 20 for the 400° to 600° C. heated product. Further heating in the range of 700° to 1,000° C. may increase the value to 100 to 1,000 or more. The thermal stabilities of these polymers are orders of magnitude higher than the thermal stabilities of polymers prepared by solution condensation of dialdehydes and diamines. This greatly improved thermal stability was unpredictable and entirely unexpected.

The above examples are merely illustrative and are not to be understood as limiting the scope of the invention. It will be apparent that various modifications in the procedures described above may be made within the spirit and scope of the invention.

What is claimed is:

1. A process for preparation of a tractable polymer having repeating units of the formula

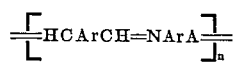

where Ar is an arylene moiety selected from the class consisting of a phenylene group, a diphenylene group and a group consisting of two phenylene groups linked by a component of the class consisting of O, S, SO$_2$, CH$_2$, C$_2$H$_2$, CH$_2$ and SO$_2$, N—CH$_3$, C=O, and NH and $n$ is at least 5 which comprises reacting an acetal of the formula (RO)$_2$HCArCH(OR)$_2$ where Ar is said arylene moiety and R is an alkyl group with an amine compound selected from the group consisting of an aromatic diamine of the formula H$_2$NArNH$_2$ where Ar is said arylene moiety, an acylamine of the formula RCOHNArNHOCR where Ar is said arylene moiety and R is an alkyl group and a Schiff base of the formula R'HC=NArN=CHR' where Ar is said arylene moiety and R' is an aryl group.

2. A process for preparation of a polymer having the formula

where Ar is an arylene moiety selected from the class consisting of a phenylene group, a diphenylene group and a group consisting of two phenylene groups linked by a component of the class consisting of O, S, SO$_2$, CH$_2$, C$_2$H$_2$, CH$_2$ and SO$_2$, N—CH$_3$, C=O, and NH, R is an alkyl group having no more than ten carbon atoms and $n$ is at least 5 which comprises reacting an amine having the formula H$_2$NArNH$_2$ where Ar is said arylene moiety with an acetal having the formula (RO)$_2$HCArCH(OR)$_2$ where Ar is said arylene moiety and R is said alkyl group.

3. A process for preparation of a fusible, black polymer having the formula

where Ar is an arylene moiety selected from the class consisting of a phenylene group, a diphenylene group and a group consisting of two phenylene groups linked by a component of the class consisting of O, S, SO$_2$, CH$_2$, C$_2$H$_2$, CH$_2$ and SO$_2$, N—CH$_3$, C=O, and NH, R is an alkyl group having no more than ten carbon atoms, and $n$ is at least 5 which comprises heating a mixture of an amine having the formula H$_2$NArNH$_2$ where Ar is said arylene moiety and an acetal having the formula (RO)$_2$HCArCH(OR)$_2$ where Ar is said arylene moiety and R is said alkyl group to a temperature of at least 250° C. and below the temperature at which the resulting polymer becomes infusible.

4. The process of claim 3 wherein said mixture is heated in a monofunctional Schiff base having the formula

R'CH=NR' wherein R' is an aryl moiety.

5. The process of claim 4 wherein said monofunctional Schiff base is benzylideneaniline.

6. The process of claim 5 wherein said mixture is heated under an inert gas atmosphere.

7. A process for preparation of a polymer having the formula

where Ar is an arylene moiety selected from the class consisting of a phenylene group, a diphenylene group and a group consisting of two phenylene groups linked by a component of the class consisting of O, S, SO$_2$, CH$_2$, C$_2$H$_2$, CH$_2$ and SO$_2$, N—CH$_3$ C=O, and NH, R is an alkyl group and $n$ is at least 5 which comprises reacting an acylamine having the formula RCOHNArNHOCR where Ar is said arylene moiety and R is an alkyl group containing no more than ten carbon atoms with an acetal having the formula (RO)$_2$HCArCH(OR)$_2$ where Ar is said arylene moiety and R is an alkyl group containing no more than ten carbon atoms.

8. A process for preparation of a fusible, black polymer having the formula

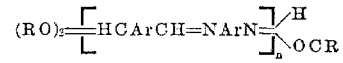

where Ar is an arylene moiety selected from the class consisting of a phenylene group, a diphenylene group and a group consisting of two phenylene groups linked by a component of the class consisting of O, S, SO$_2$, CH$_2$, C$_2$H$_2$, CH$_2$ and SO$_2$, N—CH$_3$, C=O, and NH, R is an alkyl group, and $n$ is at least 5 which comprises heating a mixture of an acylamine having the formula RCOHNArNHOCR where Ar is said arylene moiety and R is an alkyl group containing no more than ten carbon atoms and an acetal having the formula (RO)$_2$HCArCH(OR)$_2$ where Ar is said arylene moiety and R is said alkyl group to a temperature of at least about 250° C. and below the temperature at which the resulting polymer becomes infusible.

9. The process of claim 8 wherein said mixture is heated in a monofunctional Schiff base having the formula

R'CH=NR' where R' is an aryl moiety.

10. The process of claim 9 wherein said monofunctional Schiff base is benzylideneaniline.

11. The process of claim 10 wherein said mixture is heated under inert gas atmosphere.

12. A process for preparation of a polymer having the formula

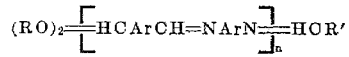

where Ar is an arylene moiety selected from the class consisting of a phenylene group, a diphenylene group and a group consisting of two phenylene groups linked by a component of the class consisting of O, S, SO$_2$, CH$_2$, C$_2$H$_2$, CH$_2$ and SO$_2$, N—CH$_3$, C=O, and NH, R is an alkyl group, R' is an aryl group and $n$ is at least 5 which comprises reacting an acetal having the formula (RO)$_2$HCArCH(OR)$_2$ where Ar is said arylene moiety, and R is an alkyl group containing no more than ten carbon atoms with a difunctional Schiff base having the formula R'HC=NArN=CHR' where Ar is said arylene moiety and R' is an aryl group.

13. A process for preparation of a fusbile, black polymer having the formula

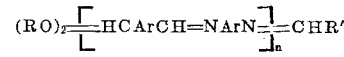

where Ar is an arylene moiety selected from the class consisting of a phenylene group, a diphenylene group and a group consisting of two phenylene groups linked by a component of the class consisting of O, S, SO$_2$, CH$_2$, C$_2$H$_2$, CH$_2$ and SO$_2$, N—CH$_3$, C=O and NH, R is an alkyl group containing no more than ten carbon atoms, R' is an aryl group and $n$ is at least 5 which comprises heating a mixture of an acetal having the formula (RO)$_2$HCArCH(OR)$_2$ where Ar is said arylene moiety and R is said alkyl group and a difunctional Schiff base of the formula R'HC=NArN=CHR' where Ar is said arylene moiety and R' is an aryl group to a temperature of at least 250° C. and below the temperature at which the resulting polymer becomes infusible and recovering the polymer formed thereby.

14. The process of claim 13 wherein said mixture is heated in a monofunctional Schiff base having the formula $$R'CH=NR'$$

wherein Ar is an aryl group.

15. The process of claim 14 wherein said monofunctional Schiff base is benzylideneaniline.

16. The process of claim 15 wherein said mixture is heated under an inert gas atmosphere.

References Cited

UNITED STATES PATENTS 3,198,767  8/1965  Matsuda et al. _____ 260—65
3,419,584  12/1968  Elslager et al. _____ 260—72.5

OTHER REFERENCES

Topchiev et al.: "Jour. Polymer Science," Part C, No. 4 (1963), pp. 1305–1313.

Stivala et al.: "Jour. Polymer Science," B2 (1964), pp. 943–946.

Danhäuser et al.: "Makromolekulare Chemie," vol. 84 (1965), pp. 238–249.

Manassen et al.: "Jour. American Chem. Soc.," vol. 88 (May 1966), pp. 1943–1947.

Akitt et al.: "Makromolekulare Chemie," vol. 56 (1962), pp. 195–199.

SAMUEL H. BLECH, Primary Examiner

U.S. Cl. X.R.

260—2.5, 37, 47, 65, 72.5, 79, 79.3